Sept. 15, 1953       S. J. MARWIL       2,652,437
ADSORPTION-STRIPPING SEPARATION SYSTEM
Filed Dec. 19, 1949
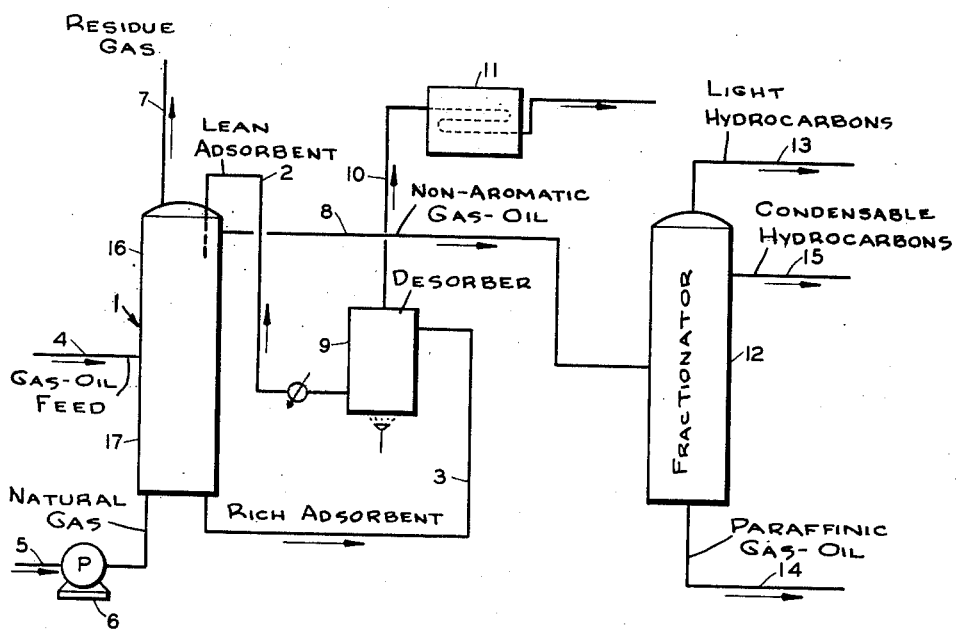
INVENTOR.
S. J. MARWIL
BY *Hudson & Young*
ATTORNEYS Patented Sept. 15, 1953

2,652,437

UNITED STATES PATENT OFFICE 2,652,437

ADSORPTION-STRIPPING SEPARATION SYSTEM

Stanley J. Marwil, Bartlesville, Okla., assignor to Phillips Petroleum Company, a corporation of Delaware Application December 19, 1949, Serial No. 133,819

3 Claims. (Cl. 260—674)

This invention relates to an adsorption-absorption process. In one aspect, it relates to an adsorption process for the extraction of aromatic hydrocarbons from gas-oils and the production of gas-oil fractions of increased aromatic hydrocarbon content. In another aspect, it relates to a process for the simultaneous production of gas-oil fractions of increased aromatic hydrocarbon content and the absorption of condensable hydrocarbons from a rich natural gas.

An object of this invention is to devise a process for producing gas-oils rich in aromatic hydrocarbons.

Another object of my invention is to devise a process for the extraction of aromatic hydrocarbons from gas-oils and the production of fractions containing increased concentrations of aromatic hydrocarbons.

Still another object of my invention is to devise a relatively simple and inexpensive process for the simultaneous production of gas-oil fractions of increased aromatic hydrocarbon content and absorption of condensable hydrocarbons from wet natural gas for the production of a natural gasoline.

In the drawing, the figure represents diagrammatically one form of apparatus for use in carrying out the process of my invention.

Referring now to the drawing, reference numeral 1 refers to a treating column of the type for carrying out continuous solid-liquid adsorption operations. The column is also of the type for conducting an adsorption operation by means of a continuously moving bed of adsorbent. The column has several feed inlet and product withdrawal connections. Conduits 2, 4, and 5, as shown, are for introduction of feed materials into the column. Conduits 3, 7, and 8 are for withdrawal of products of the process or materials in process. Column 12 is a fractionation column and is provided with an overhead product withdrawal line 13, a side stream withdrawal line 15, and a bottoms withdrawal line 14. This column may also be provided with means for introducing a refluxing material and means for introducing reboiling heat to the column. These several elements are ordinarily provided in fractionator columns and are not shown herein for purposes of simplicity. The installation and operation of such elements are well known to those skilled in the fractional distillation art.

Unit 9 is a regeneration unit of a type suitable for the regeneration of a solid adsorbent material. This element is provided with a product withdrawal line 10 containing a condenser 11, a solid material withdrawal conduit 2, and an adsorbent inlet line 3. The regenerator unit 9 may contain means for adding heat to the material to be desorbed and means for introduction of a stripping gas such as superheated steam or other inert gas. These several elements likewise are not shown in the drawing for purposes of simplicity, since their installation and operation are well known to those skilled in the adsorption art.

My process consists broadly in countercurrently contacting an aromatic hydrocarbon containing gas-oil with a solid adsorbent material of the type adapted to the adsorption of aromatic hydrocarbons. The rich adsorbent end of the column is refluxed by introduction of a rich natural gas.

A contacting column 1 is provided with a moving bed of solid adsorbent material. A gas-oil feed containing some aromatic hydrocarbons is introduced into the contacting column 1 at about a midpoint through a feed inlet line 4. When the tower becomes filled with liquid and operation is normal, the upper section 16 of the tower 1 is intended to be the enriching section in which the newly added solid adsorbent material first contacts countercurrently the gas-oil charge stock. In this section the aromatic hydrocarbons of the oil are adsorbed by the down-flowing solid adsorbent. Some non-aromatic hydrocarbons may be loosely adsorbed by the adsorbent and further, some non-aromatic hydrocarbons may be mechanically entrained by the adsorbent and carried into the lower section of the tower. This lower section may be termed a stripping section and is identified in the drawing by reference numeral 17. In this section of the tower and at the bottom thereof, the solid adsorbent material with its charge of adsorbed gas-oil hydrocarbons meets in a countercurrent manner a wet natural gas introduced through line 5. The condensable hydrocarbon constituents of the natural gas are at first absorbed by the gas-oil constituents in this stripping section 17. When the gas-oil constituents have acquired an appreciable concentration of the condensable hydrocarbons from the gas, these hydrocarbons become available to be adsorbed by the solid adsorbent. The upward-flowing natural gas exerts a marked tendency to carry upward the occluded, or loosely adsorbed, non-aromatic hydrocarbons previously carried downward by the absorbent. Upon adsorption by the adsorbent of some of the absorbed condensable hydrocarbons from the oily liquid, the first hydrocarbons to be desorbed are of the less aromatic type. Upon liberating these non-aromatic hydrocarbons from the adsorbent, the upward-flowing natural gas assists in transporting these liberated hydrocarbons upward in the tower. A region is present near the bottom of the section 17 in which some of the more strongly adsorbed aromatic hydrocarbons are desorbed by the condensable hydrocarbons in solution. These desorbed aromatic hydrocarbons are likewise carried upwardly in the tower by the rising natural gas. As the non-aromatic and aromatic components rise up the tower, a zone is reached in which the concentration of the rising aromatic hydrocarbons exceeds the concentration of the aromatic hydrocarbons from the feed stock and at this point, these rising aromatic hydrocarbons will be re-adsorbed. At some point still higher in the column, some of the non-aromatic hydrocarbons will also be re-adsorbed. In this manner, an internal reflux is obtained in this tower. Specifically, this refluxing consists of release of adsorbed, non-aromatic and aromatic hydrocarbons in the bottom of zone 17 and re-adsorption of these aromatic hydrocarbons at some higher point in zone 17 or even at a point in the lower portion of zone 16 and the re-adsorption of some of the non-aromatic hydrocarbons at points higher in the tower. This natural gas refluxing operation results in the production of an aromatic gas-oil fraction having a greater aromaticity than a gas-oil produced by adsorption in the absence of my natural gas refluxing. The light components in the natural gas not absorbed by the gas-oil in the lower section of the tower will also act as a desorbing agent in both the upper and lower sections of the tower. The amount of desorption taking place within the tower can be controlled by the natural gas feed rate and the tower pressure and temperature.

The effluent natural gas leaves my absorption-adsorption tower through the overhead line 7 and is conducted to such disposal as desired. This gas is freed or substantially freed from hydrocarbons generally considered to be condensable gasoline hydrocarbons. A non-aromatic gas-oil product leaves the tower through the line 8 at a point in the top of the tower or very near the top of the tower. Since a gas or vapor issues from the top of this treating tower, some little vapor space is ordinarily provided in the dome of the tower and under such conditions, any liquid draw-off line must be attached to the tower at some small distance below this vapor space. The non-aromatic oil removed through line 8 contains most of the condensable hydrocarbons extracted or removed by absorption from the natural gas, and these condensable hydrocarbons are separated from the non-aromatic oil in distillation or stripping column 12. This column is operated in such a manner that the condensable hydrocarbons are stripped from the oil and leave the vessel through the sidedraw line 15 while the dissolved lighter constituents are taken overhead through line 13. This material may be condensed, if desired, to form a natural gasoline product, and may be piped directly to storage or other disposal as desired. The heavy oil from which the condensed hydrocarbons have been removed is removed from the bottom of tower 12 through the bottoms draw-off line 14 and is passed to storage or to other disposal, such as charge stock to cracking stills. Through the conduit 3 is passed the solid adsorbent material with its charge of adsorbed aromatic hydrocarbons. This conduit 3 is preferably some type of endless conveyor such as the bucket conveyor, or it may be a spiral or screw conveyor. The adsorbent material is charged into the desorber unit 9 which is operated at such a temperature that with or without use of a stripping agent the adsorbed hydrocarbons will be desorbed. I prefer, however, to use some form of stripping agent, such as superheated steam or other inert gas. Superheated steam as a stripping agent is preferred in case this agent is not detrimental to the activity of the solid adsorbent. The stripping gas with the stripped hydrocarbons leaves the desorber through line 10. Condensable materials are condensed in cooler 11 and condensate is passed into a storage tank or to other disposal, not shown. The re-vivified, or regenerated, solid adsorbent is removed through conduit 2 for re-introduction into the main contacting vessel 1. This conduit 2 is also a type of conveyor adapted to elevate finely-divided solid materials, such as a bucket conveyor.

The absorption operation carried out in the primary vessel 1 may be carried out at atmospheric temperature if desired. However, it may be carried out at other temperatures higher than atmospheric or even at temperatures below atmospheric. While the operation may be carried out at temperature between the approximate limits of 50° and 120° F., I prefer to operate the primary contacting step at about atmospheric temperature. I prefer to carry out this operation at a pressure as low as possible. The pressure in the vessel 1 will, due to the head of material in the vessel, have to be some greater than atmospheric pressure. Of the materials charged into the vessel, the natural gas introduced through line 5 under the influence of pump 6 will need to be maintained at a pressure sufficiently high to overcome the static head. The gas-oil charged into the vessel may be introduced at a pressure some lower than that of the gas due to a smaller static head at this point. If this operation is carried out at a temperature much above atmospheric temperature, it is obvious that pressures will have to be increased accordingly so as to obtain efficient contacting between the gaseous and the other phases in the vessel. For operating between the temperature limits of 50° and 120° F., I prefer to operate the vessel at pressures between the approximate limits of 0 and 100 p. s. i. g.

As an example of the operation of my process for the production of a gas-oil of high aromaticity, a catalytically cracked gas-oil containing aromatic and non-aromatic hydrocarbons and having an aniline point of 150° F. is introduced into the main contacting vessel 1. A solid adsorbent material such as silica gel of 8–10 mesh size is introduced continuously into the vessel through conduit 2. The vessel is first filled with the solid adsorbent material and prior to the introduction of any of the feed stocks. A wet natural gas under sufficient pressure for introduction into the bottom of the vessel is introduced through pipe 5. Contacted natural gas is removed from the vessel through the overhead line 7, while a non-aromatic gas-oil product containing absorbed condensable hydrocarbons is withdrawn through line 8 and the solid adsorbent material with its charge of adsorbed aromatic hydrocarbons is withdrawn through the conduit 3. A valve or other withdrawal apparatus is provided in conduit 3 for the withdrawal of solid adsorbent to the exclusion of liquid from the bottom of column 1. The solid adsorbent is passed into desorber 9 which is operated under such conditions that the aromatic hydrocarbons are removed and are withdrawn through line 10, condensed in condenser 11, and passed to storage. The regenerated adsorbent solid is moved by conveyor 2 from the regenerator and elevated and re-introduced into the primary contactor 1. The non-aromatic oil with its charge of natural gas hydrocarbons is subjected to stripping conditions in the stripper 12 in such a manner that the previously absorbed hydrocarbons are taken overhead through line 13 as vapor and these are condensed and passed to storage, not shown. The bottoms representing the non-aromatic portion of the gas-oil is removed from the stripper through line 14 and passed to storage.

I have given below three examples illustrating the utility and operability of my process. The adsorption and absorption data of these examples are taken at a temperature of 90° F. and at an absolute pressure of 50 pounds per square inch. Example I is tabulated in Table I. This Example I shows the amount of silica gel adsorbent required for countercurrent contacting with a given amount of aromatic hydrocarbon containing gas-oil for the production of a high aromatic content gas-oil. In this particular case, a charge of 72,400 pounds of silica gel are required for treating 5,040 gallons of charge oil per hour. These quantities of charge materials represent 2 pounds of silica gel per pound of gas-oil charge. The raffinate or non-aromatic gas-oil phase comprises 85 volume per cent of the original charge oil. This oil had an aniline point of 175° F. and a density of .81. This high aniline point value indicates that the oil is free or substantially free from aromatic hydrocarbons. The extracted material, or rather, the desorbate recovered from the silica gel adsorbent comprises 15 volume per cent yield based on the volume of charge oil. This material had an aniline point of 46° F. and a density of .93. This very low aniline point figure along with the relatively high density indicates that this desorbate oil is very high in its aromatic hydrocarbon content.

*Table I*

|  | Case I | Case III |
|---|---|---|
| Charge Oil, 150° A. P., mol. wt. 227, density .861 | Cat. Cracked | Cat. Cracked |
| Charge Oil Feed Rate, gal./hr | 5,040 | 5,040. |
| SiO₂ Gel Rate, lbs./hr | 72,400 | 55,400. |
| Lbs. Gel/Lb. Gas Oil | 2.00 | 1.53. |
| High A. P. Gas Oil Product: |  |  |
| Yield, Vol. Percent | 85 | 95.5.[1] |
| Aniline Point, °F | 175 | 183.[1] |
| Density | .81 | .787.[1] |
| Low A. P. Gas Oil Product: |  |  |
| Yield, Vol. Percent[2] | 15 | 20. |
| Aniline Point, °F | 46 | 40. |
| Density | .93 | .94. |

[1] Gas Oil (80%) + absorbed material from natural gas (15.5%).
[2] Based on 50 A. P. blended product.

In Table II are given the operating conditions of an absorption operation in which an absorption oil similar to the above-mentioned charge oil is contacted with the natural gas having the composition given. Column 2 of Table II gives the composition of the raw gas charge stock in terms of mols per day based on a total daily charge volume of 4,550,000 cubic feet. In column 3 of Table II is given the number of mols per day of each component absorbed by the gas-oil, while column 4 gives the number of mols per day of the gaseous components which are passed from the contacting column as residue gas. Beneath columns 3 and 4 in Table II are given specifications of a column required to effect the absorption operation illustrated by the data in columns 3 and 4. To effect this absorption, a column 4 feet in diameter, 50 feet in height, and having 20 trays was required.

In Case III of this example, the same amount of charge oil as was used in Case I is introduced into the column through charge line 4 and to produce a high quality aromatic gas-oil only 55,400 pounds of 8–10 mesh silica gel per hour was required. Into the bottom of the column is introduced 4,550,000 cubic feet per day of natural gas having the composition given. The data given in these illustrations are for contacting of the charge materials at atmospheric temperature. The non-aromatic containing gas-oil product recovered comprised a yield of 95.5 volume per cent based on the gas-oil charge. Of this 95.5 volume per cent, 15.5 per cent was due to the presence of the condensable natural gas hydrocarbons extracted from the gas, and the remaining 80 per cent was an oil of low aromatic content. This 95.5 volume per cent oil had an aniline point of 183° F., while its density was .787. This higher aniline point and lower density values were, of course, due to the presence of the absorbed natural gas hydrocarbons.

The high aromatic oil product comprised 20 volume per cent on an absorbed natural gas hydrocarbon-free basis. This yield was based on the volume of charge oil, which yield is 5 volume per cent higher than the yield when natural gas was not used for refluxing. The data given under Case III for the low aniline point gas-oil product is based on a condensable hydrocarbon gas-free

*Table II*

| Raw Gas Charge Stock | | Absorption Oil-Cat. Cracked Gas-Oil, 150° F., Aniline Point, Mol. Wt. 227, Density 0.861 | | | |
|---|---|---|---|---|---|
| | | Case II, Absorption Gas-Mole Per Day | | Case III, Combined Absorption-Adsorption | |
| Component | Mols Per Day | Absorbed | Residue Gas | Absorbed | Residue Gas |
| N₂ | 800 | 0 | 800 | 0 | 800 |
| CO₂ | 249 | 3 | 246 | 0 | 249 |
| H₂S | 225 | 16 | 209 | 0 | 225 |
| C₁ | 6,215 | 44 | 6,171 | 28 | 6,187 |
| C₂ | 1,481 | 70 | 1,411 | 30 | 1,451 |
| C₃ | 1,138 | 186 | 952 | 86 | 1,052 |
| iC₄ | 125 | 51 | 74 | 118 | 7 |
| nC₄ | 424 | 249 | 175 | 402 | 22 |
| iC₅ | 67 | 66 | 1 | 66 | 0 |
| nC₅ | 131 | 131 | 0 | 131 | 0 |
| C₆ | 97 | 97 | 0 | 97 | 0 |
| C₇ | 48 | 48 | 0 | 48 | 0 |
|  | 11,000 | 961 | 10,039 | 1,006 | 9,993 |
| 4,550,000 cu. ft. at 13.45 lbs. per sq. in. absolute at 60° F. | | Absorption Column, 50 ft. high, 20 trays, 4 ft. diameter. | | Absorption-adsorption Column, 20 ft. high, 4 ft. diameter (no trays). | | basis. The aniline point of the product was 6° F. lower than the case carried out in the absence of the natural gas refluxing operation. This lower aniline point is indicative of higher aromaticity. In keeping with the higher aromatic hydrocarbon content of this oil, it is to be noted that its density is also higher. In columns 5 and 6 of Table II are given the mols of absorbed hydrocarbons in the non-aromatic gas-oil product and the mols of gaseous hydrocarbons in the residue gas. These quantities in columns 5 and 6 are, of course, given in terms of mols per day. At the bottom of columns 5 and 6 in Table II are given the data as to the size of the contacting tower 1 required to effect the operation included in Case III to obtain the increased yield of higher aromatic gas-oil. With my natural gas refluxing, the primary column is only 20 feet in height and 4 feet in diameter. Such a column, of course, does not contain contacting trays as would be required when no solid adsorbent is present.

In Case III in which the adsorption of the aromatic hydrocarbons by the silica gel is refluxed by the natural gas, it should be noted that only 55,400 pounds of silica gel per hour are required for treating the same amount of charge oil as required 72,400 pounds of silica gel without the natural gas refluxing. Thus, in Case III the ratio of gel per pound of gas-oil was 1.53 as compared to a ratio of 2.00 without my gas refluxing. This decreased requirement of gel adsorbent material represents a tremendous saving in capital investment and operating costs. The increased yield of higher aromatic gas-oil also is a marked advantage. At the same time, when using my natural gas refluxing, 1,006 mols of hydrocarbon gases were absorbed by the gas-oil as compared to 961 mols per day by conventional absorption methods.

The above-described flow system and examples are given for illustrative purposes and should not be regarded as limiting my invention, the scope of which is set forth in the following claims.

Having described my invention, I claim:

1. A process for producing a gas-oil of enhanced aromaticity from a gas-oil containing at least some aromatic hydrocarbons comprising maintaining a downward-flowing stream of solid adsorbent material of the type adapted to adsorb aromatic hydrocarbons in a contacting zone having an inlet end and an outlet end with respect to flow of adsorbent, introducing gas-oil containing aromatic hydrocarbons into said contacting zone and therein contacting said gas-oil and said solid adsorbent countercurrently at a temperature from 50° to 120° F. at greater than atmospheric pressure whereby aromatic hydrocarbons and some non-aromatic hydrocarbons are retained by said solid adsorbent material, refluxing said solid adsorbent material by introducing a natural gas containing condensable hydrocarbons into the outlet end of said zone, removing natural gas denuded of condensable hydrocarbons from the inlet end of said zone as one product of the process, removing a stream of gas-oil denuded of aromatic hydrocarbons and containing said condensable hydrocarbons from the inlet end of said zone, recovering said condensable hydrocarbons and said gas-oil denuded of said aromatic hydrocarbons from this latter stream as additional products of the process, removing solid adsorbent material from the outlet end of said zone and recovering therefrom a gas-oil of enhanced aromaticity as a main product of the process.

2. In the process of claim 1, cycling said solid adsorbent material from which a gas-oil of enhanced aromaticity has been recovered into the inlet end of said zone as the first mentioned solid adsorbent material.

3. The process of claim 2 wherein the solid adsorbent material is adsorbent silica.

STANLEY J. MARWIL.

References Cited in the file of this patent

UNITED STATES PATENTS

| Number | Name | Date |
| --- | --- | --- |
| 1,875,199 | Parkman | Aug. 30, 1932 |
| 1,948,779 | Abbott et al. | Feb. 27, 1934 |
| 2,384,311 | Kearby | Sept. 4, 1945 |
| 2,398,101 | Lipkin | Apr. 9, 1946 |
| 2,425,535 | Hibshman | Aug. 12, 1947 |
| 2,470,339 | Claussen et al. | May 17, 1949 |